United States Patent [19]

Douglas

[11] 4,267,627

[45] May 19, 1981

[54] ATTACHMENT FOR VALVE SPRING DEPRESSING TOOL

[76] Inventor: Ray Douglas, 210 S. Madison, Box 396, Thompson Falls, Mont. 59873

[21] Appl. No.: 104,440

[22] Filed: Dec. 17, 1979

[51] Int. Cl.[3] .............................................. B23P 19/04

[52] U.S. Cl. .......................................... 29/217; 29/219

[58] Field of Search ................. 29/215, 216, 217, 218, 29/219, 220, 221

[56] References Cited

U.S. PATENT DOCUMENTS

| | | | |
|---|---|---|---|
| Re. 19,414 | 1/1935 | Clark | 29/219 |
| 1,037,691 | 9/1912 | Wanamaker | 29/217 |
| 1,395,901 | 11/1921 | Booth | 29/219 |
| 4,176,435 | 12/1979 | Castoe | 29/220 |

OTHER PUBLICATIONS

Duro-Chrome Tool Catalog, Duro Metal Products Co., Chicago, Ill.; Catalog #37-M.

*Primary Examiner*—James L. Jones, Jr.
*Attorney, Agent, or Firm*—Wells, St. John & Roberts

[57] ABSTRACT

An attachment that enables use of a common valve spring tool for selectively depressing valve return springs found within deep axial recesses within an engine cylinder head. The attachment includes a yoke that is pivoted to a bracket which, in turn, can be selectively mounted to the spring tool. Pins on the yoke define a first pivot axis. An elongated spring depressing member is pivoted to the yoke on a second axis perpendicular to the first axis. The depressing member includes an elongated leg that extends from the yoke to a ring at a bottom end thereof. The ring is circular and centered on the second axis with the leg being spaced to one side thereof. The ring engages a valve spring and forces it down to expose the valve stem and spring keepers thereon. The leg, being spaced to one side of the second axis, allows free access to the exposed parts of the valve assembly.

7 Claims, 5 Drawing Figures

ATTACHMENT FOR VALVE SPRING DEPRESSING TOOL

BACKGROUND OF THE INVENTION

The present invention relates to attachments for valve spring depressing tools and more particularly to such an attachment that facilitates depression of valve springs within deep recesses within an engine cylinder head.

It is common with modern four cylinder automotive engines that the valve train assembly be of the "overhead cam" configuration. With such an arrangement, the operational valve cam is rotatably mounted at the top of the engine cylinder head. The cam lobes directly engage followers mounted to the valve assemblies. This arrangement increases engine efficiency by eliminating the push rod and rocker arm assemblies typical in older, larger engines.

In order to keep weight and size at a minimum, the cam is journalled at the very top of the engine head and the valve stems are set within relatively axial recesses in the cylinder head casting. Access to the valve springs and associated elements is therefore hindered.

The typical valve assembly includes a spring or two concentric springs that operate against the valve stem to hold the valve head in a closed position. The cam, working against the spring, causes the valve stem and head to move downwardly, opening the adjacent intake or exhaust port. The valve stem is connected to the return springs through a keeper assembly that must be removed to allow removal of the valves from the cylinder head. The keepers must also be removed if the valve springs are to be removed for replacement or testing.

To facilitate removal of the spring keepers, a special tool has been developed which resembles a "C clamp". A threaded member at one end of the clamp is positioned in engagement with the valve face at the bottom of the valve. The remaining end of the clamp includes a spring engaging "jaw" attachment that sets against the spring but does not engage the valve stem. Tightening of the clamp assembly causes depression of the spring and results in exposure of the keepers. "C clamp" type depressing tools are very effective for older model engines where the valve springs are exposed and easily accessible. They do not work effectively on the smaller engines where the valve springs are set within axial recesses in the cylinder head. The spring engaging attachments will not reach down into the recess to engage the spring.

Unsuccessful attempts have been made to provide a serviceable attachment to the conventional "C clamp" spring depressing tools that would permit their use in such situations. For example, "Duro-chrome" tools of Duro Metal Products Company, Chicago, produce a "medium offset jaw" that will attach to the "C clamp" spring depressing tools for use in overhead valve engines. However, the offset jaws are integral with the bracket which mounts them to the "C clamp" arrangement. The offset is, by experience, insufficient to position the spring engaging jaws deeply enough within many of the current engine cylinder heads. Furthermore, the integral nature of the jaw and bracket often interferes with finger access to the valve keepers within the narrow confines of the cylinder head recess.

Another unsuccessful attempt at a solution to the above problem was to do away entirely with the "C clamp" spring depressing tool and make use of a lever depressing device. With this arrangement, the engine cylinder head must be secured to a flat plate. The plate, in turn, is secured to a work bench. A bar extending the full length of the cylinder head is then bolted to the top surface of the head. A lever arm is pivoted to the bar and includes a spring depressing member mounted thereto.

Downward forceful movement against the outward end of the bar will move the spring depressing member into contact with the valve return springs and depress them, exposing the keepers and top end of the valve stem. The mechanic must hold the lever down with one hand while removing the keepers from the valve stem with his free hand. This can be a dangerous and at best a very cumbersome process, often resulting in one of the keepers falling from the stem further down into the head recess.

It is much more desirable to make use of a device such as the "C clamp" depressing tool or some other form of valve return spring depressing tool that permits use of both hands to gain access to the valve keepers or elements associated therewith.

The present invention is an attachment that mounts easily to existing "C clamp" arrangements or can be used with an independent tool for depressing and holding valve return springs in a depressed condition while simultaneously allowing maximum access to the exposed area of the valve for both of the mechanic's hands. A single offset leg extends downwardly into the depression, with a ring mounted at the bottom end of the leg to engage and depress the spring. The top of the valve and the keepers become exposed as the spring is depressed. Access is maximized by the offset leg which can also be pivoted about an upright axis to assure easy access to the keepers or associated elements.

DETAILED DESCRIPTION OF A PREFERRED EMBODIMENT

Figure 1:
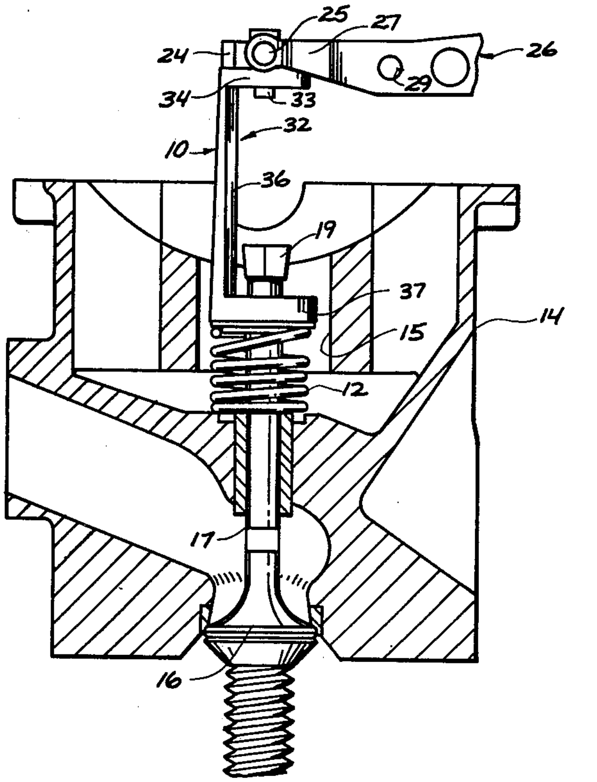
FIG. 1 is a fragmentary schematic view illustrating a cylinder head with a valve assembly having springs depressed by the present attachment.

The present spring depressing attachment is designated in the accompanying drawings by the reference numeral 10. The attachment is adapted to be mounted to a spring depressing tool, such as a "C clamp" type tool shown at 11 in FIG. 2. The tool 11 is used and has been used effectively in performing valve work, especially for the purpose of securing a valve while the associated valve return spring or springs 12 are depressed within the engine cylinder head 14. The present attachment 10 allows operation of the standard "C clamp" type of spring depressing tool with an engine cylinder head 14 that has deep recesses 15 within which the valve return springs 12 are positioned.

For purposes of description, the valve assembly illustrated in FIG. 1 includes a valve head 16 and an integral, upwardly extending valve stem 17. The stem 17 mounts removable valve spring keepers 19 which operatively interconnect the spring 12 and valve stem 17 to hold the valve in a closed position across its associated intake or exhaust port.

The tool 11 includes a substantially "C" shaped frame 20 having a threaded valve head engaging clamp member 21 at one end of the "C" configuration and a remaining end 22 that is adapted to receive any one of several forms of valve spring engaging attachments.

The present attachment 10 basically includes a yoke member 24 having coaxial pivot pins 25 extending from opposite ends thereof. The pivot pins 25 define a first axis that is perpendicular to the axis of clamp member 21.

Bracket means is provided at 26 for mounting the yoke 24 to the tool 11. The means 26 is simply comprised of a pair of bracket arms having bifurcations 27 at outward ends thereof for pivotably receiving the pivot pins 25 therebetween. The bracket arms 28 include transverse apertures 29. These apertures 29 are positioned along the lengths of the bracket arms 28 to match with existing apertures provided within the end of the standard "C clamp" valve tool.

Figure 2:
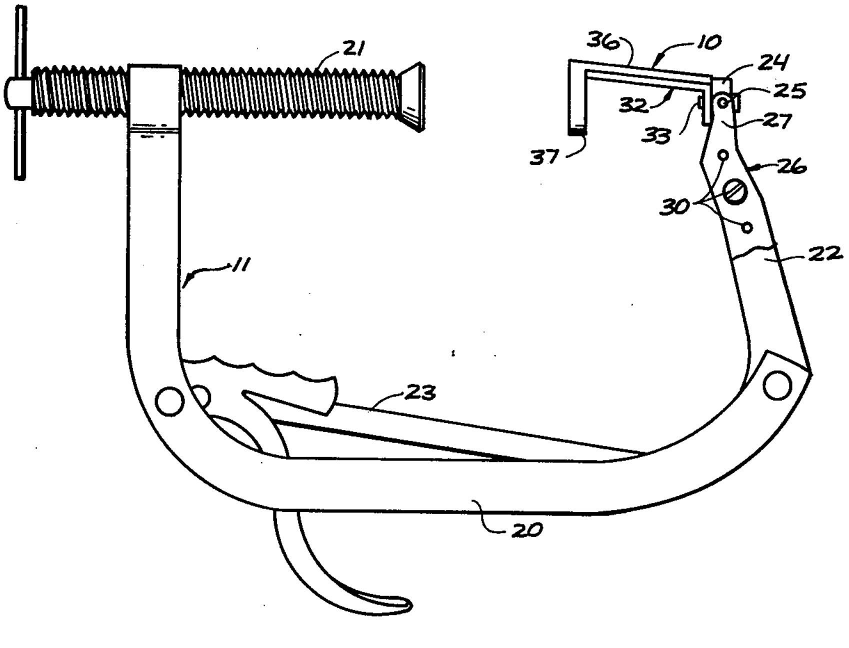
FIG. 2 is a reduced side elevation view of the present attachment shown mounted to a conventional "C clamp" spring tool.

Appropriate screws or bolts can be secured through the aligned apertures to secure the present attachment 10 to the clamp tool. FIG. 2 illustrates the tool and attachment secured together by appropriate mounting screws 30.

The yoke member 24 pivotably mounts an elongated spring depressing member 32. A pin 33 extends between the spring depressing member 32 and the yoke 24 to define a second pivot axis perpendicular to the first axis. The second axis is longitudinally oriented with respect to the overall length of the elongated member 32.

The pin 33 may be provided as an integral part of either yoke member 24 or spring depressing member 32. Alternately, the pin 33 can be provided separately as a bolt or rivet pin arrangement extending through appropriate apertures in both the yoke member and spring depressing member 32.

Spring depressing member 32 includes an upwardly facing plate 34. A planar surface 35 on the plate 34 slidably engages an oppositely facing surface of the yoke member 24. The two surfaces are held in sliding engagement by the pin 33 to provide limited frictional resistance to rotation of the depressing member 32 in relation to the yoke (about the second axis). Therefore, the spring depressing member 32 will rotate only when forced and will remain at any selected position about the second pivot axis.

The spring depressing member 32 also includes an elongated leg 36 extending downwardly from the plate 34 to a remote end where a circular ring 37 is located. The leg 36 is rigidly secured to or is integral with the plate 34 and ring 37. Leg 36 positions the circular ring 37 so its center lies along the second axis. Leg 36 is radially spaced from the axis to produce a large open access area between the plate 34 and ring 37.

Figure 3:
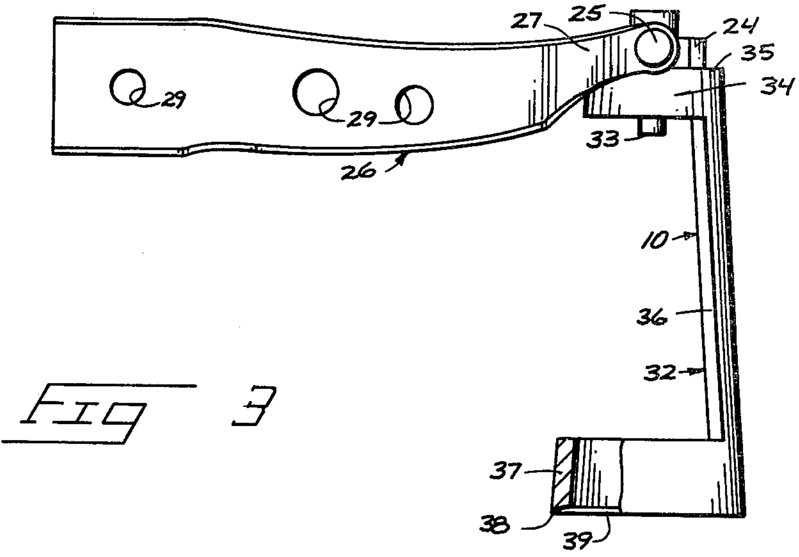
FIG. 3 is an enlarged side view of the present invention and mounting bracket for attaching it to the "C clamp" tool.
Figure 4:
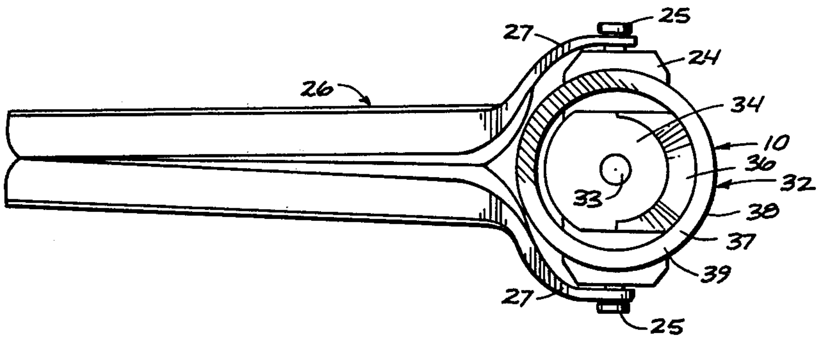
FIG. 4 is a bottom plan view as seen from below in FIG. 3.
Figure 5:
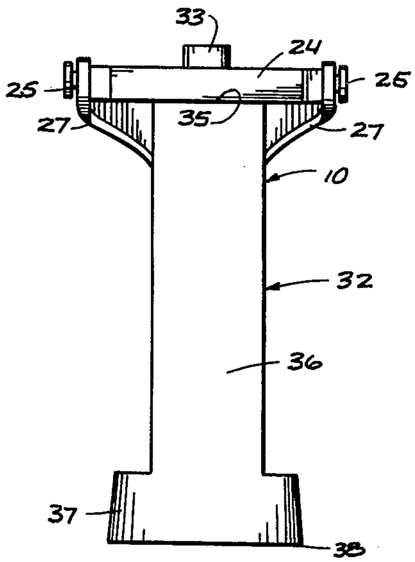
FIG. 5 is an end view as seen from the right in FIG. 3.

The ring 37 is best shown with reference to FIGS. 3 and 4. Ring 37 includes a bottom peripheral circular edge 38. The peripheral edge 38 lies along a plane that is perpendicular to the second axis and parallel to the first axis. The edge 38 is situated at the outward side of a beveled spring engaging surface 39. This surface 39 leads in and upwardly toward the yoke from the edge 38. It serves to substantially center the spring depressing member 32 with the central axis of the spring and valve stem coaxial with the second axis of the present attachment.

From the above technical description, operation of the present invention may now be understood.

Prior to operation, the present attachment is mounted to the appropriate clamp tool. It may be secured to the standard form of "C clamp" tool arrangement 11 shown in FIG. 2. For purposes of example, then, the present operation will be described in conjunction with the standard "C clamp" 11 illustrated in FIG. 2.

The attachment is first mounted to the free end of the clamp tool 11 by screws 30 or other appropriate fastening mechanisms so that the spring depressing member 32 is oriented toward the clamp member 21. The clamp member 21 is then opened so that the gap between clamp member 21 and attachment 10 is greater than the height of the head 14 as shown in FIG. 1.

The tool 11 is then situated so that the spring depressing member 32 can be pivoted about pins 25 into position over the valve return spring 12 and so the beveled spring engaging surface 39 engages the spring top.

When the depressing member 32 is in place, the mechanic may selectively tighten the clamp member 21 bringing its end into flush engagement with the valve face. The beveled surface 39 has a tendency to center the member 32 with respect to the spring so the axis of the spring and valve are coaxial with the second axis of the attachment. The mechanic may then selectively position the leg 36 about the second axis to gain maximum manual access to the valve stem and spring keepers 19. Subsequent tightening of the clamp member 21 forces the spring depressing member 32 downwardly and causes corresponding compression of the valve return springs 12. The top of the valve stem and the valve keepers are then exposed and easily accessible. The mechanic is then free to loosen his grip on the clamp member 21 and use both hands to maximum advantage in removing or replacing the keepers, or whatever associated element of the valve assembly he desires to gain access to.

Removal of the clamp and attachment 10 from the cylinder head may be accomplished by simply reversing the steps set forth or through a quick release mechanism 23 provided as a standard feature of the clamp tool 11.

It is pointed out that the above description and attached drawings are set forth as examples of a preferred form of my invention and do not specifically set forth the intended scope of my invention which is more fully set out by the following claims:

What I claim is:

1. A spring depressing attachment for a valve spring depressing tool that enables selective compression of valve return springs on engine cylinder heads wherein the valve return springs are situated within axial cylinder head recesses, said attachment comprising:

a yoke member;

bracket means on the yoke member for pivotably mounting the yoke member to the valve spring depressing tool about a first axis;

an elongated spring depressing member pivotably mounted to the yoke about a second axis perpendicular to the first axis and having a length dimension greater than the depth of the axial cylinder head recess;

said spring depressing member having an elongated leg extending outwardly from the yoke; and a ring at an outward end of the leg adapted to extend into an axial recess within the cylinder head and engage a valve return spring therein.

2. The attachment as defined by claim 1 wherein said bracket means includes coaxial pins extending outwardly from opposite ends of the yoke, defining said first axis.

3. The attachment as defined by claim 2 wherein said bracket means further comprises a bracket arm adapted to be mounted to the valve spring depressing tool and having a bifurcated end pivotably mounting the coaxial pins.

4. The attachment as defined by claim 1 wherein the second axis is longitudinal with respect to the elongated spring depressing member and wherein the ring is circular, with its center lying along the second axis.

5. The attachment as defined by claim 1 wherein the ring is circular and includes an annular spring engaging surface that is centered on the second axis and is beveled from a peripheral outer rim inwardly toward the yoke.

6. The attachment as defined by claim 1 wherein the leg is radially offset from the second axis.

7. The attachment as defined by claim 1 wherein the yoke and spring depressing members are joined at oppositely facing slidably engaging surfaces thereof and wherein the second axis is defined by a pin that pivotably interconnects the yoke and spring depressing member.

* * * * *